ically adapted for securing a covering of braided wire about the tubing without the need for welding the covering to the connectors. In the braided wire embodiments of the invention, the covering is inserted intermediate a specially configured retainer nut and the outer corrugations of the tubing. The retainer nut clamps the covering in position relative to the retainer nut and the tubing.

United States Patent [19]
Laney

[11] 4,437,691
[45] Mar. 20, 1984

[54] CONNECTOR FOR CORRUGATED TUBING

[76] Inventor: Ralph M. Laney, 6511 Marsol Rd. Bld.-6 Apt.-323, Mayfield Heights, Ohio 44124

[21] Appl. No.: 268,792

[22] Filed: Jun. 1, 1981

[51] Int. Cl.³ .................... F16L 17/00; F16L 19/00; F16L 19/08
[52] U.S. Cl. .................... 285/353; 285/354; 285/DIG. 4; 285/55; 285/331; 285/342
[58] Field of Search .................... 285/12, 353, 354, 356, 285/386, 52, DIG. 4

[56] References Cited

U.S. PATENT DOCUMENTS

| | | | |
|---|---|---|---|
| 1,337,547 | 4/1920 | Dohner | 285/354 X |
| 2,306,018 | 12/1942 | Fentress | 153/73 |
| 2,749,963 | 7/1956 | Candee | 153/73 |
| 2,756,804 | 7/1956 | Schindler et al. | 153/73 |
| 2,796,109 | 7/1957 | Wood | 153/73 |
| 2,843,926 | 7/1958 | Turner | 29/511 |
| 3,008,738 | 11/1961 | Longfellow | 285/354 X |
| 3,273,916 | 9/1966 | Tillery | 285/226 |
| 3,408,093 | 10/1968 | Epstein | 285/52 |
| 3,501,171 | 3/1970 | Baron | 285/52 |
| 3,743,328 | 7/1973 | Longfellow | 285/226 |
| 3,934,902 | 1/1976 | McNamee | 285/DIG. 4 |

FOREIGN PATENT DOCUMENTS 1371609   10/1974   United Kingdom ......... 285/DIG. 4

OTHER PUBLICATIONS

Anaconda Vibration Eliminators Bulletin VE315, (4ED).
Anaconda Pump Connectors Bulletin PC-1, (6ED).
Anaconda Flexpipe Bulletin FP-6, (5ED).
Anaconda Metal Hose Products Bulletin AP, (4ED).
Anaconda Corrugated Metal Hose Bulletin CR, (4ED).
Anaconda Chemical Transfer Hose Bulletin CT, (4ED).
American Metal Products Corp., Brochure.

Primary Examiner—Richard J. Scanlan, Jr.

[57] ABSTRACT

A connector for connecting corrugated tubing to pipes or fittings permits the corrugated tubing to be used without any modification to its ends. The corrugated tubing need only be cut to length by severing at a "valley" of one of the corrugations. A ferrule in the form of semi-annular half-sections is fitted about the endmost corrugations of the severed tubing. Inwardly extending projections of the ferrule engage at least one of the valleys to prevent relative axial movement between the ferrule and the tubing. A retainer nut previously placed over the tubing is slipped over the ferrule to retain the ferrule in place. An outwardly extending portion of the ferrule engages an inner portion of the nut to prevent axial movement of the nut over the ferrule. An O-ring or other sealing member may be inserted within the retainer nut and positioned against the endmost corrugation of the tubing. Thereafter, the retainer nut can be threaded about an existing pipe or fitting and tightened in place until deformation of the end corrugation and/or the sealing member occurs. A fluid-tight seal results. Various embodiments of the invention are disclosed, including several especi

6 Claims, 17 Drawing Figures

CONNECTOR FOR CORRUGATED TUBING

BACKGROUND OF THE INVENTION

1. Field of the Invention

The invention relates to connectors for tubing and, more particularly, to connectors for (a) attaching corrugated tubing to other structures without special modification of the tubing and (b) securing a covering of braided wire in position about the tubing.

2. Description of the Prior Art

Although various types of connectors for tubing are known, these known connectors have suffered from several drawbacks. One of the most important drawbacks relates to a need to modify the ends of tubing in order to connect the tubing to other structures. For example, in the case of well-known riser tubes used in residential plumbing systems, one end of a corrugated tube must be formed without corrugations. The uncorrugated, straight-walled end section is adapted to receive a nut and an annular ferrule. The end section with ferrule attached then can be inserted within the inner diameter of an existing fitting and the nut can be tightened about the tube so as to compress the ferrule within the fitting. Upon continued tightening of the nut, the ferrule or the tube, or both, will be deformed and a fluid-tight seal will be created. In many circumstances, however, a consumer installing such a tube may improperly tighten the nut if care is not taken, and the connector often will leak.

The other end of a typical riser tube includes an upset portion having an annular flange for attachment to existing plumbing fixtures. Although connection of such an upset end portion to a fitting is relatively easy, such a connection by definition requires that the tube be manufactured with an upset end portion. Consequently, the cost of producing the tube is higher than desired.

The requirement that both ends of a riser tube be specially configured necessarily limits the lengths of tubes which can be used by consumers. That is, because very few individuals doing plumbing work possess the equipment needed to modify the ends of a corrugated tube to permit it to be used with existing connectors, corrugated tubing having appropriately configured ends must be manufactured in discreet lengths so that consumers can select a length of tubing appropriate for the job at hand. Obviously, the expense of manufacturing and maintaining an inventory of otherwise identical tubing, differing only in length, presents a considerable difficulty to manufacturers and distributors. It also presents a difficulty to the consumer who must carefully choose the proper length of tubing when making a purchase.

Yet an additional problem with corrugated tubing relates to the performance of the tubing itself as regards vibration and internal pressures. In certain applications, corrugated tubing is provided with a covering of braided wire rigidly secured to connectors attached to the tubing at each end. Assuming that the braided wire is of proper length and is rigidly secured to the connectors, the wire will prevent tube elongation under high internal pressure. The wire also will dampen vibration in the tube and can provide some protection for the tube from such undesirable influences as abrasion and impact.

A problem with prior corrugated tubing employing braided wire has been the attachment between the wire and the connectors carried by the ends of the tubing. In the past, it has been necessary to weld the wire braid to the connectors. Welding is undesirable because it is timeconsuming, is difficult to carry out on a production basis, and it may adversely affect the strength characteristics of the tubing or the connectors. In addition, welding the wire to the connectors reduces the available materials from which the connectors, the tubing, or the wire can be chosen. Desirably, a connector for tubing would include provisions for securing a covering of braided wire or other material to the connector and/or the end of the tubing without the need for welding.

In view of the foregoing difficulties, it is an object of the present invention to provide a connector for corrugated tubing in which no special modification of the ends of the tubing are required to effect a fluid-tight seal.

It is yet another object of the invention to provide a connector for corrugated tubing whereby the tubing can be cut to length by the user of the tubing and the connector can be fitted to the end of the tubing at the job site.

It is yet another object of the invention to provide a connector for corrugated tubing by which a covering of braided wire or other material can be quickly secured in place about the tubing without the need to weld the covering to either the connector or the tubing.

SUMMARY OF THE INVENTION

In response to the foregoing concerns and in carrying out the objects of the invention, the present invention provides a new and improved connector for corrugated tubing in which modification of the ends of the tubing is not necessary to establish a fluid-tight connection and in which a covering of braided wire or other material can be properly secured in place about the tubing without the need for welding. The invention is particularly adaptable to annularly corrugated tubing and will be described in such an environment.

In order to use the connector according to the invention, a corrugated tubing is severed is one of the corrugation "valleys" by means of a hacksaw or other cutting device. The connector includes a retainer nut which is fitted over the end of the tubing, as well as a ferrule in the form of specially configured, semi-annular half-sections which are fitted about the end of the tubing. The half-sections engage the corrugations at the end of the tubing so that relative axial movement between the tubing and the half-sections is not possible. In one embodiment of the invention, an elastomeric sealing member, such as an O-ring, is fitted within the retainer nut and is pressed in place against the endmost corrugation of the tubing and the end of the assembled half-sections. Thereafter, the retainer nut can be connected to a pipe or other existing fitting. Continued tightening of the nut will cause the pipe or fitting to engage the sealing member and/or the endmost corrugation of the tubing. Yet additional tightening of the retainer nut will cause sufficient displacement of the sealing member or the corrugation, or both, to effect a fluid-tight seal. The ferrule prevents axial displacement of the retainer nut relative to the tubing and thereby permits the sealing member and/or the endmost corrugation of the tubing to be deformed. Ferrules of various configurations may be provided to accommodate various existing fittings or to take into account different tubing wall thicknesses, material compositions, or corrugation forms.

An alternative embodiment of the invention is provided for those instances where a covering of braided wire or other material is to be fitted about the tubing. The invention is particularly useful with a covering of wire and will be described hereafter in such an environment. A preferred version of the braided wire embodiment employs a retainer nut adapted to loosely surround the end of the tubing. The end of the wire covering is fitted intermediate the inner diameter of the retainer nut and the outer diameter of the tubing. A cylindrical bushing also is fitted between the inner diameter of the covering and the outer diameter of the tubing. A ferrule in the form of alternating washer-like half-sections is fitted about one or more of the endmost corrugations of the tubing. A compression nut is threaded within the inner diameter of the retainer nut and is engageable with the endmost washer. Upon continued tightening of the compression nut, the washers and spacers are brought into contact with each other and the endmost corrugations of the tubing are compressed axially. The compression nut presses into the flask of the endmost corrugation and forms a seal by deforming and displacing the wall of the tube end. Also, the wire covering is tightly radially compressed. Accordingly, the retainer nut and the bushing tightly hold the covering, and the retainer nut and the compression nut effectively are clamped to the end of the tubing. Different versions of the braided wire embodiment include a unitary ferrule and different retaining nut configurations for clamping the wire covering.

The net result of using the present invention is that corrugated tubing can be supplied to consumers, either industrial or domestic, in discreet or continuous lengths which can be easily sized to fit individual job requirements. It no longer is necessary for tubing manufacturers to provide discreet lengths of tubing having specially configured end portions. Moreover, the attachment of a braided wire covering can be carried out with the utmost simplicity, without welding, and without regard for the materials of which the covering and the tubing are comprised. With either embodiment of the invention, a substantial savings in tubing manufacturing expense and on-site assembly time is made possible. These advantages and a fuller understanding of the invention may be had by referring to the following description and claims, taken in conjunction with the accompanying drawings.

DESCRIPTION OF THE PREFERRED EMBODIMENT

Figure 1:
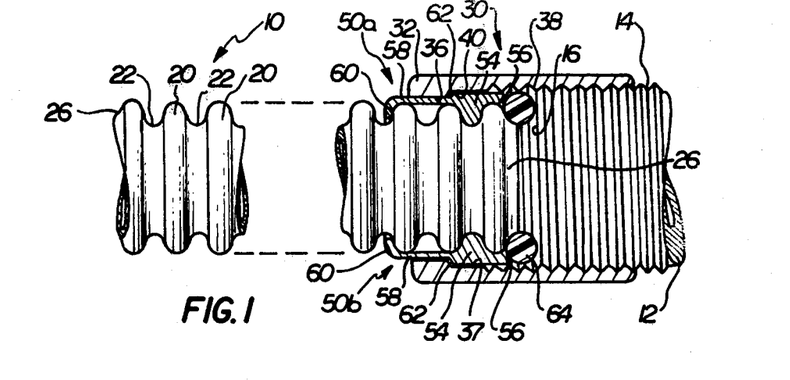
FIG. 1 is an elevational view, partly in section, of a corrugated tubing to which connectors according to the invention have been applied.

Referring to FIG. 1, a tube 10 is shown connected at one end to a pipe 12 having a threaded end portion 14. The end portion 14 includes a generally flattened end surface 16. The tube 10 includes annular corrugations defined by alternating crests 20 and troughs, or valleys 22. In those instances where the tube is severed at a location intermediate adjacent crests 20, a facing, inclined flank 26 will be formed. The tubing 10 can be formed from a variety of materials, but most likely will be formed from copper, brass, or a plastics material.

A connector 30 according to the invention includes a retainer nut 32 adapted to be fitted about the end of the tube 10. The nut 32 shown in FIG. 1 is connected to the threaded end portion 14 of the pipe 12 in conventional fashion. The nut 32 includes a bore 36 having a relatively small inner diameter. The bore 36 is slightly larger than the outer diameter of the crests 20. The nut 32 also is counterbored as at 37 and the counterbored portion 37 includes a threaded portion 38. The threaded portion 38 is engageable with the threaded end portion 14. A shoulder 40 connects the bore 36 and the counterbored portion 37. The nut 32 also has a number of flats 42 on its outer surface to facilitate gripping by a wrench.

The connector 30 also includes a ferrule 50 in the form of half-sections 50a, 50b adapted to be placed about the endmost corrugations of the tube 10. Each of the half-sections 50a, 50b includes a body portion 54 adapted to mate with at least one corrugation of the tube 10, an end face 56, an elongate, relatively thin-walled extension 58, and an inwardly turned end portion 60. The outer diameter of the body portion 54 and the extension 58 are different, and a shoulder 62 is formed at approximately the mid-point of the ferrule 50. The connector 30 also includes a sealing member in the form of an O-ring 64. The O-ring 64 is comprised of an elastomeric substance so that it can be readily deformed in order to carry out a sealing function.

The connector 30 is assembled by first cutting a length of tubing 10 adequate for the job at hand. The tube 10 can be cut by any conventional technique such as through the use of a hacksaw, pipe cutter, and the like. The tube is severed in the root section of one of the valleys 22 so that a flank 26 is formed. Thereafter, the half-sections 50a, 50b defining the ferrule 50 are fitted together about the end of the tube 10 so that the body portion 54 is fitted between opposed crests 20. The nut 32 then is slipped over the tube 10 until the bore 36 engages the outer surface of the extension 58 and the shoulders 40, 62 are in contact with each other. The O-ring 64 then is placed inside the nut 32 and the threaded portion 38 is secured to the end portion 14. Upon sufficient tightening of the nut 32, the components of the connector 30 eventually will attain that configuration shown in FIG. 3. The O-ring 64 will be distorted radially outwardly and inwardly into fluid-tight engagement with the end surface 16, the flank 26, the end face 56, and the counterbored portion 37. The assembly will be held together tightly by the interaction of the shoulders 40, 62 and by engagement between the body portion 54 and one of the crests 20.

Figure 2:
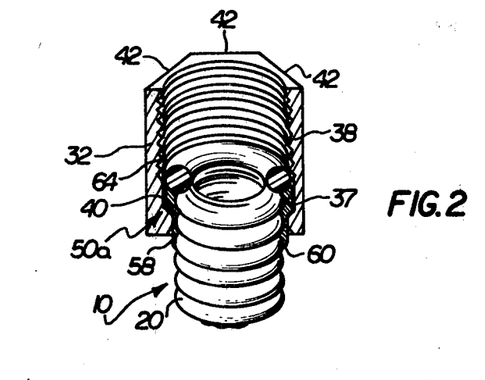
FIG. 2 is a perspective view of one end of the connector and tubing of FIG. 1, with portions of the connector being broken away and removed for clarity.
Figure 3:
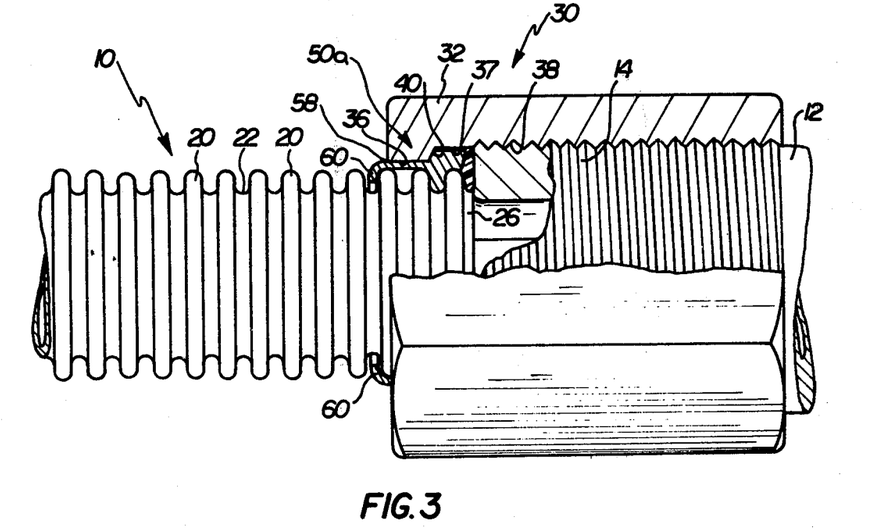
FIG. 3 is an enlarged elevational view of the end of the tubing of FIG. 1, with a portion of the connector broken away and removed for clarity, and showing a sealing member in a compressed, fluid-tight configuration.
Figure 4:
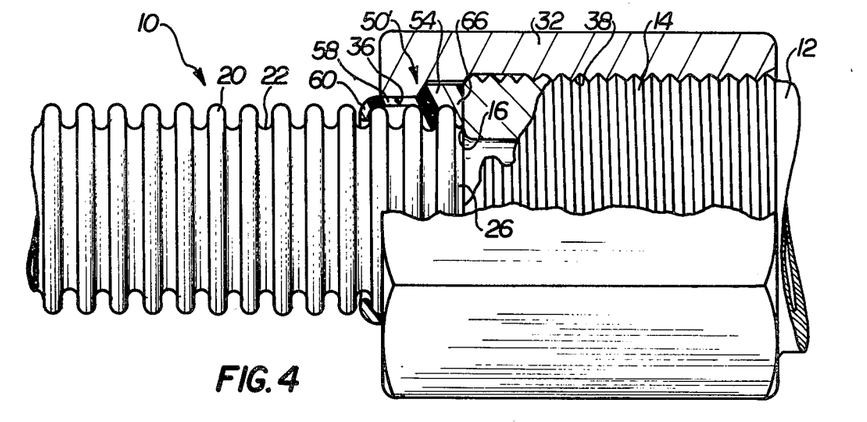
FIG. 4 is an enlarged elevational view of the end of the tubing of FIG. 1, illustrating a different form of ferrule which may be used with the connector.

The embodiment of the invention shown in FIG. 4 is substantially similar to that shown in FIGS. 1–3, except that the sealing member 64 is replaced by an elastomeric ferrule 50' having an extra end section 66 extending forwardly of the flask 26 of the tube 10. The end section 66 engages the end surface 16 and, like the O-ring 64, is deformed upon tightening of the nut 32 so as to create a fluid-tight seal.

Figure 5:
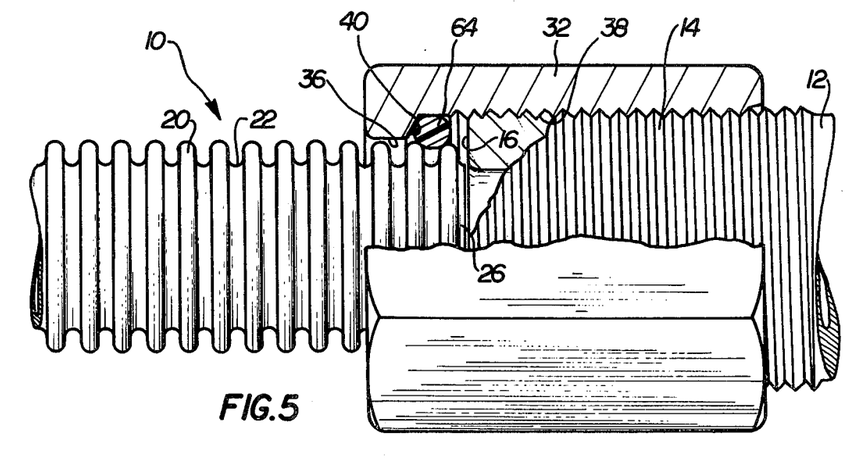
FIG. 5 is a view similar to FIG. 4 in which a sealing member is used, but a ferrule is not used.
Figure 6:
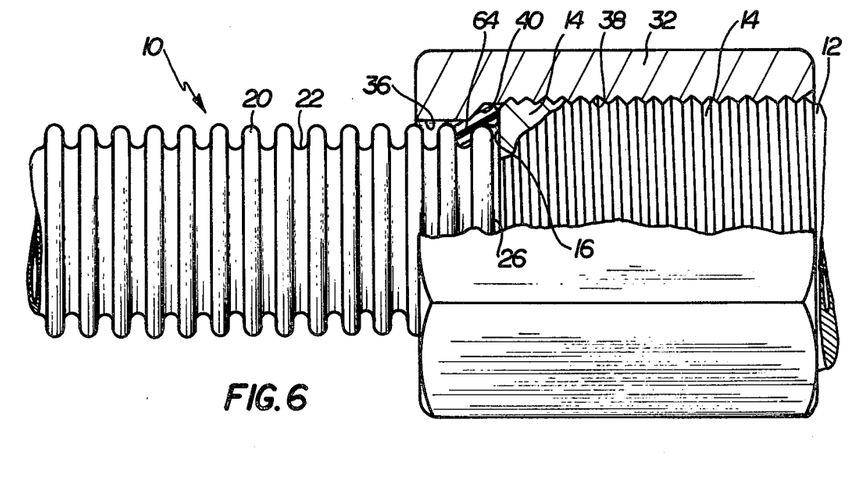
FIG. 6 is a view similar to FIG. 5 showing the components of FIG. 5 in a compressed, fluid-tight configuration.

Referring to FIGS. 5 and 6, an alternative embodiment of the invention is shown. In this and subsequent embodiments of the invention, reference numerals from the earlier-described embodiments will be used where appropriate. In the embodiment of the invention shown in FIGS. 5 and 6, the tube 10 again is joined to the threaded end portion 14 by means of the nut 32. The ferrule 50 is not used, and the sealing member 64 performs both a sealing function and a mechanical connection function formerly performed by the ferrule 50. In this embodiment of the invention, the O-ring 64 is tightly stretched into place intermediate the last two crests 20. Upon tightening the nut 32, the O-ring 64 will be contacted by the shoulder 40 and distorted to that configuration shown in FIG. 6. If the O-ring has been properly sized, deformation adequate to provide a fluid-tight seal as well as reasonable mechanical strength will occur. The embodiment of FIGS. 5 and 6 is not as preferred as other embodiments of the invention, because the mechanical connection between the tube 10 and the pipe 12 is not as strong. Nevertheless, for certain applications, and certainly in emergency situations, an adequate connection can be made using this embodiment of the invention.

Figure 7:
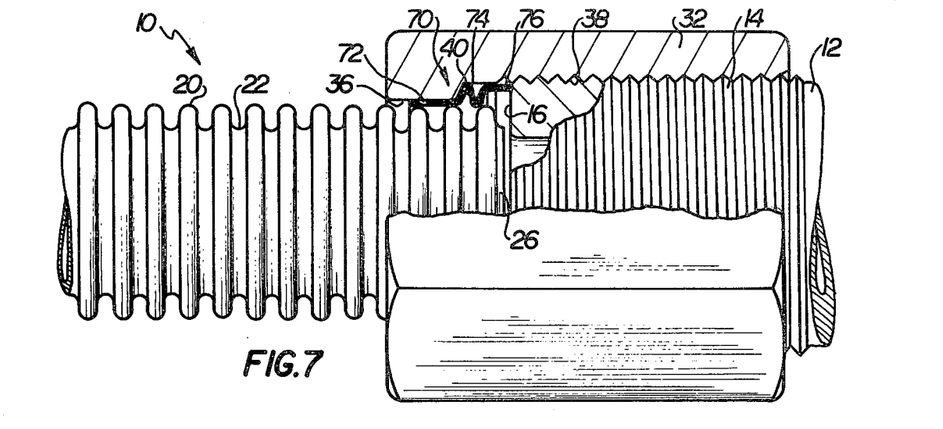
FIG. 7 is a view similar to FIG. 4 showing a ferrule which also acts as a sealing member.
Figure 8:
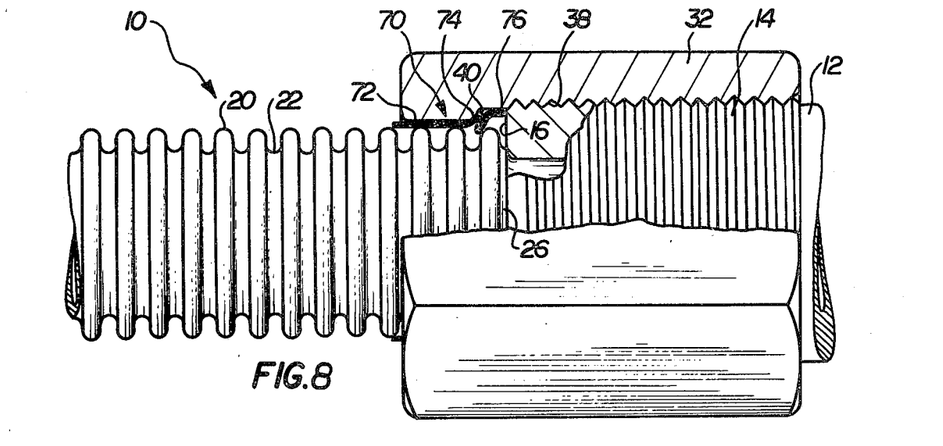
FIG. 8 is a view similar to FIG. 7 showing the components of FIG. 7 in a compressed, fluid-tight configuration.

Yet another embodiment of the invention is illustrated in FIGS. 7 and 8. In this embodiment of the invention, a separate sealing member is not used, and a modified ferrule 70 provides both a sealing function and a mechanical connection function formerly performed by the ferrule 50. The ferrule 70, in undistorted configuration (FIG. 7), includes a cylindrical body portion 72 having a corrugated portion 74 and an enlarged-diameter, cylindrical end portion 76. The ferrule 70 is of unitary, metallic construction and is sized to be able to be tightly fitted about the crests 20 of the tube 10. The ferrule 70 is made of a material softer than the other components of the assembly so that it will be the first to be deformed. Upon tightening the nut 32 and after abutting the flank 26 with the end surface 16, the end surface 16 will contact the end portion 76. Continued displacement of the nut 32 and the pipe 12 relative to each other will result in the corrugated portion 74 becoming buckled. Referring now to FIG. 8, the buckled corrugated portion 74 will be tightly compressed between the shoulder 40 and the endmost crest 20. The end portion 76 will be tightly engaged by the end surface 16. Accordingly, the ferrule 70 will provide both mechanical and fluid-sealing capabilities.

Figure 9:
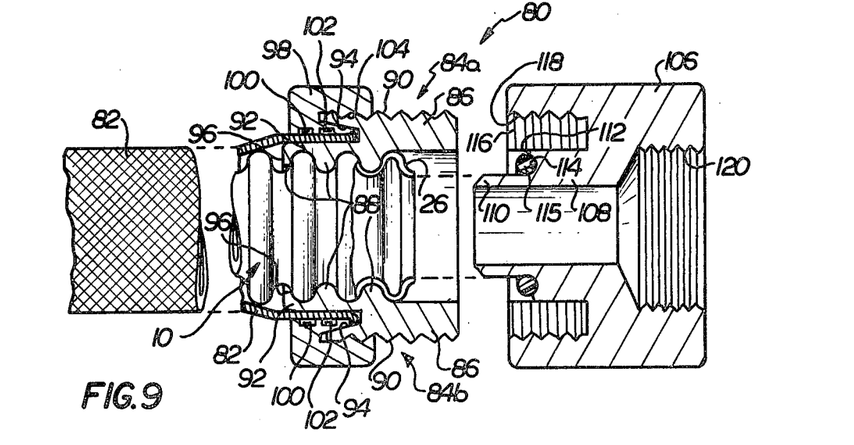
FIG. 9 is a view similar to FIG. 1, in which the tube is covered by braided wire and specially configured nuts and ferrules are used to seal the end of the tube and clamp the braided wire.
Figure 10:
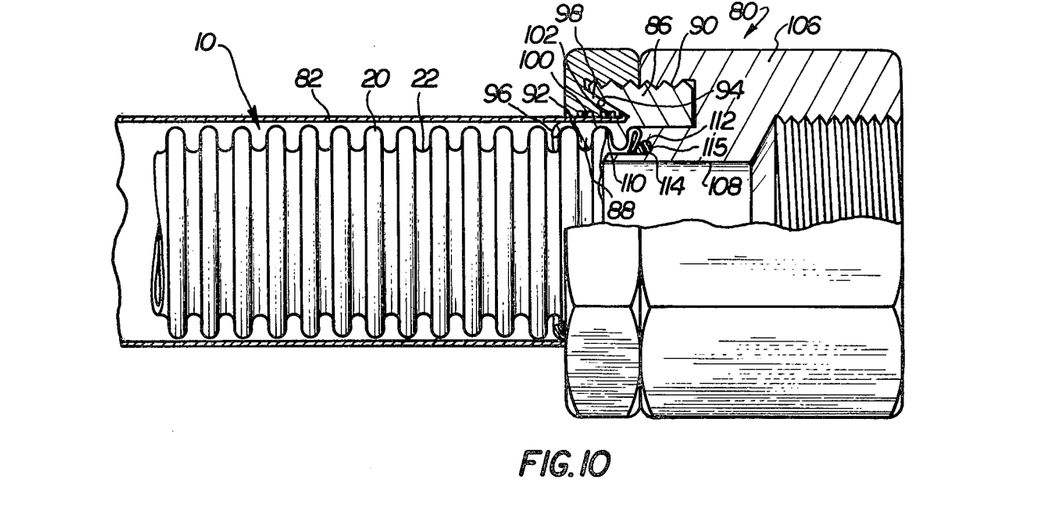
FIG. 10 is a view similar to FIG. 9, showing the components of FIG. 9 in a compressed, fluid-tight configuration.
Figure 11:
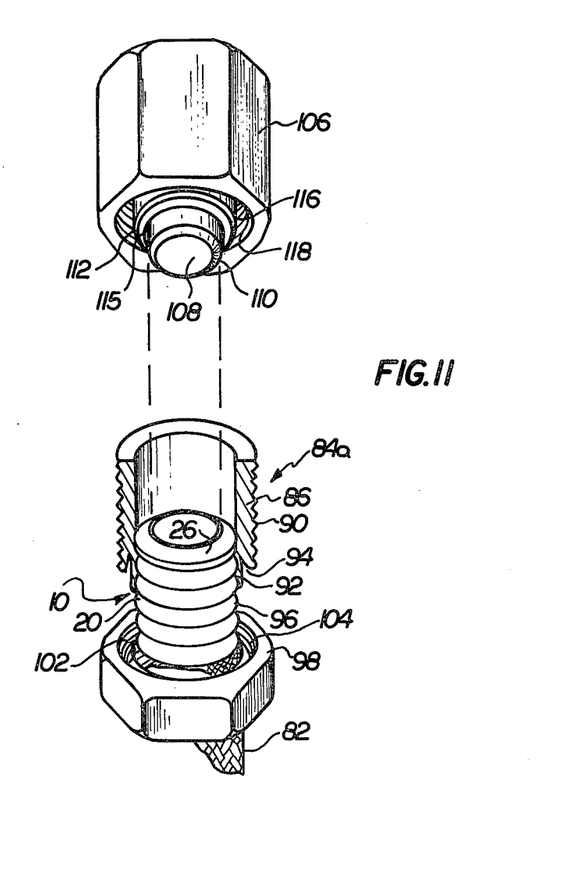
FIG. 11 is an exploded, perspective view of the embodiment of FIGS. 9 and 10, with certain portions being broken away and removed for clarity.

Referring to FIGS. 9–11, an embodiment of the invention especially adapted for attaching a covering of braided wire about the tube 10 is shown. A connector 80 not only engages the end of the tube 10, but also securely clamps a braided wire covering 82 fixedly with respect to the tube 10 without the need for welding. The connector 80 includes a ferrule 84 in the form of half-sections 84a, 84b each having a body portion 86, corrugations 88 for engagement with the corrugations on the tube 10, a threaded outer diameter 90, an extension 92, a beveled slot 94 at that part of the body portion 86 adjacent the extension 92, and an inwardly turned end portion 96. A retainer nut 98 is fitted about the end of the tube 10 and includes, on its inner surface, a plurality of serrations 100. The nut 98 also includes a beveled rim 102 engageable with the beveled slot 94 of the ferrule 84. The nut 98 also includes a threaded portion 104 for engagement with the threaded outer surface 90 of the ferrule 84.

A compression nut 106 also is engageable with the ferrule 84 and the end of the tube 10. The compression nut 106 includes a cylindrical center section 108 having a projecting, relatively sharp end portion 110. The nut 106 also includes a wall 112 within which an annular groove 114 has been formed. A sealing member in the form of an O-ring 115 is contained in the groove 114. An annular slot 116 is disposed radially outwardly of the wall 112 and includes a threaded surface 118 for engagement with the threaded outer surface 90 of the ferrule 84. The nut 106 also includes a threaded inner surface 120 for connection to a pipe or other conventional fitting.

Assembly of the embodiment of FIGS. 9–11 is carried out as follows:

1. The tube 10 is cut to a desired length and the two-part ferrule 84a, 84b is fitted about the endmost corrugations of the tube 10.

2. The covering 82 is pushed over the tube 10, over the corrugated portion 88 of the ferrule 84, and into the slot 94 as far as it will go.

3. The retainer nut 98 is pushed over the covering 82 and is threaded tightly into engagement with the ferrule 84. The interacting wedging action of the slot 94 and the rim 102 causes the covering 82 to be tightly compressed against the outer surface of the extension 92 of the ferrule 84. The serrations 100 securely grip the outer surface of the covering 82.

4. The O-ring 115 is placed in the groove 114 and the compression nut 106 is threaded onto the ferrule 84. Continued tightening of the nut 106 results in contact between the projection 110 and the O-ring 115 with the flank 26. The endmost portion of the tube 10 and the O-ring 115 are deformed to that configuration shown in FIG. 10, whereupon a fluid-tight seal is created.

Figures 12, 13, 14:
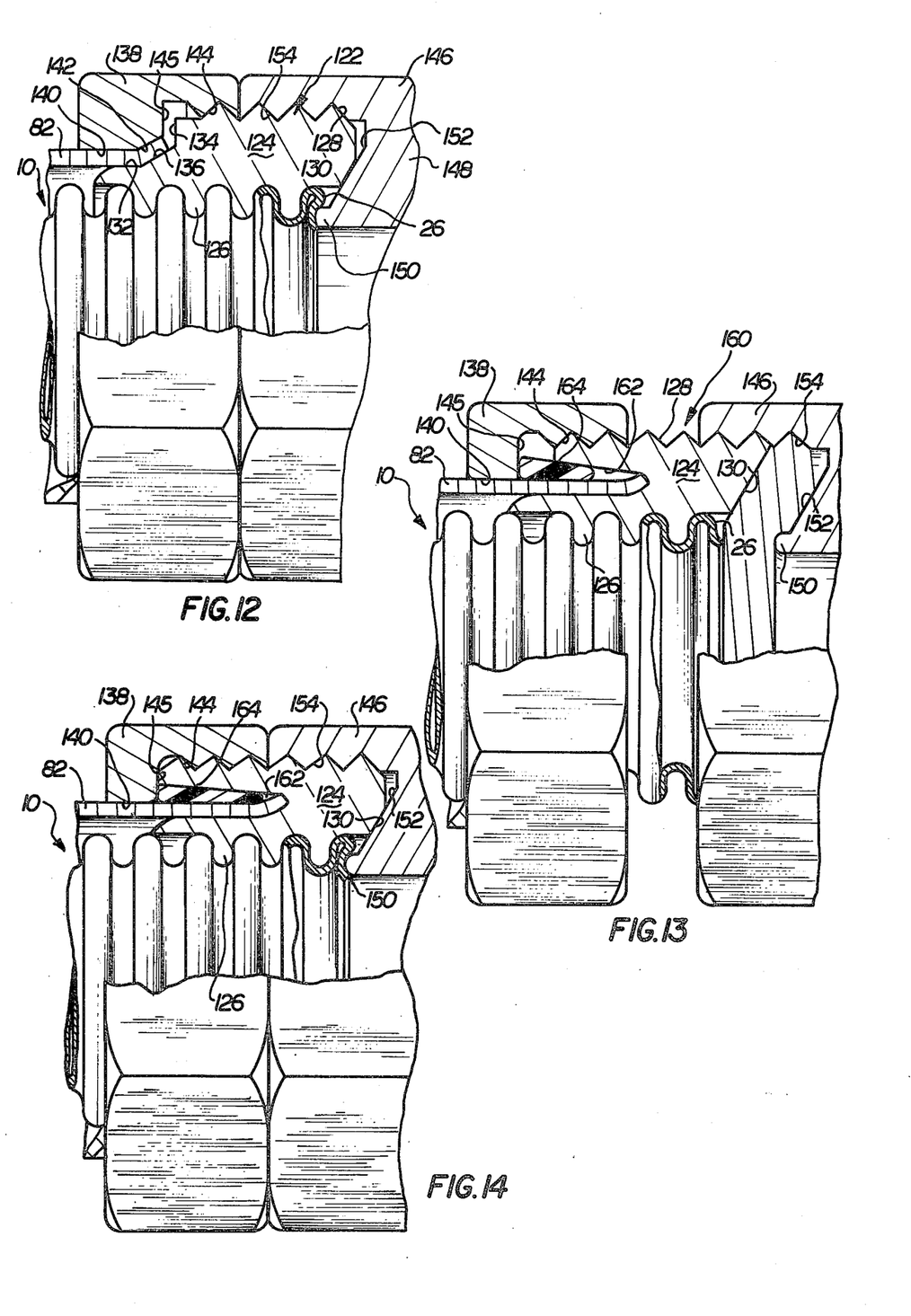
FIG. 12 is an embodiment of the invention similar to that shown in FIGS. 9-11, in which a modified form of ferrule is used.
FIG. 13 is a view similar to FIG. 12 in which yet another form of ferrule is used.
FIG. 14 is a view of the embodiment of FIG. 13 showing the components in a compressed, fluid-tight configuration.

The embodiment of the invention illustrated in FIG. 12 is similar to that shown in FIGS. 9-11. The components of the invention shown in FIG. 12 are in a deformed, fully assembled configuration. A ferrule 122 includes a body portion 124 having a plurality of inwardly directed corrugations 126 engageable with the corrugations included as part of the tube 10. The outer surface 128 of the ferrule 122 is threaded. The ferrule 122 also includes an inclined end surface 130. The other end of the ferrule 122 includes a horizontally disposed portion 132, a vertically disposed portion 134, and a connecting portion 136 inclined at an angle to the horizontal.

A retaining nut 138 is threaded about the outer portion of the tube 10 and the ferrule 122. The nut 138 includes an inner diameter 140 larger than the diameter of the portion 132, and sufficient to contain the covering 82 therebetween. The nut 138 also includes a portion 142 inclined from the horizontal the same angle as the portion 136. The nut 138 also includes a threaded inner surface 144 engageable with the threads 128 and a shoulder 145 connecting the portion 142 and the surface 144. A compression nut 146 includes a body portion 148 having a forwardly projecting, rounded inner end surface 150. The nut 146 also includes an inclined surface 152 engageable with the inclined surface 130, as well as a threaded surface 154 engageable with the threaded surface 128.

Assembly and operation of the embodiment of FIG. 12 is similar to that of the already-described embodiment of FIGS. 9-11. The corrugations 126 firmly retain the ferrule 122 relative to the tube 10, and the covering 82 is firmly clamped in place relative to the tube 10 and the connector by being compressed between the confronting surfaces 132, 140 and 136, 142. The end portion 150 deforms the flank 26, and the surfaces 130, 152 tightly engage each other so as to provide a fluid-tight seal.

The embodiment of the invention illustrated in FIGS. 13 and 14 is similar to that shown in FIG. 12, and only the important differences will be described. A ferrule 160 is largely similar to the ferrule 122, except that a tapered slot 162 has been formed in the body portion 124, and the surface 136 has been eliminated. A beveled, elastomeric ring 164 is insertable in the slot 162. The nut 138 has been modified by extending the depth of the threaded surface 144 and the inclined portion 142 has been eliminated. As can be seen in FIG. 13, during initial assembly of this embodiment of the invention, the covering 82 is inserted into the slot 62 as far as it will go and the ring 164 is also placed in the slot 162 on the outer surface of the covering 82. Upon tightening of the components (FIG. 14), the ring 164 is deformed until it fills substantially all of the space in the slot 162 not occupied by the covering 82. The covering 82 thus is tightly wedged within the slot 162 and is securely retained relative to the tube 10.

Figure 15:
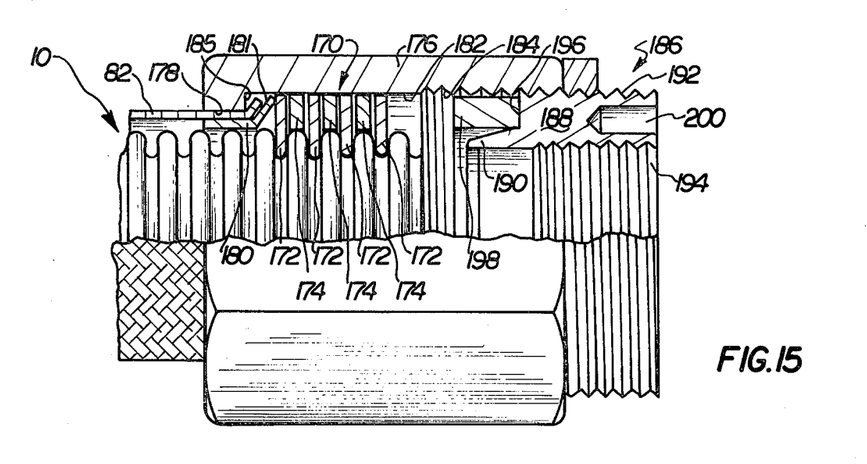
FIG. 15 is a view similar to FIG. 9 of an especially preferred embodiment of the invention adapted to secure a covering of braided wire in place about a corrugated tube.
Figure 16:
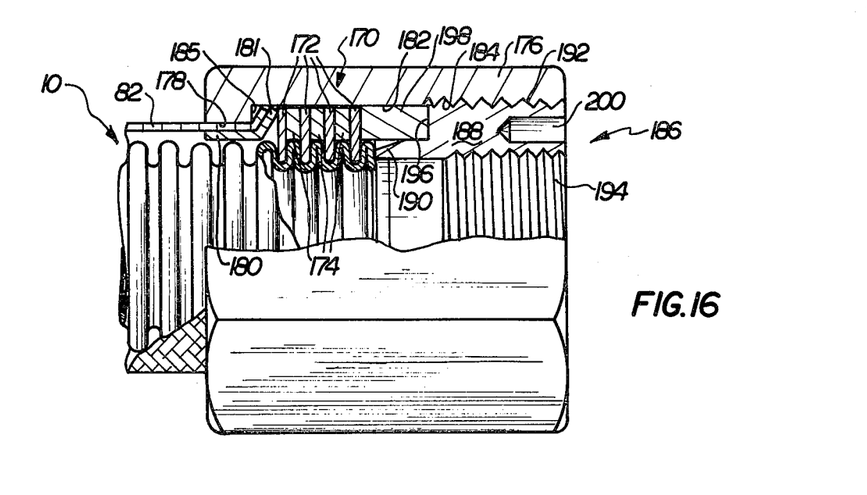
FIG. 16 is a view of the embodiment of FIG. 15 showing the components in a compressed, fluid-tight configuration.
Figure 17:
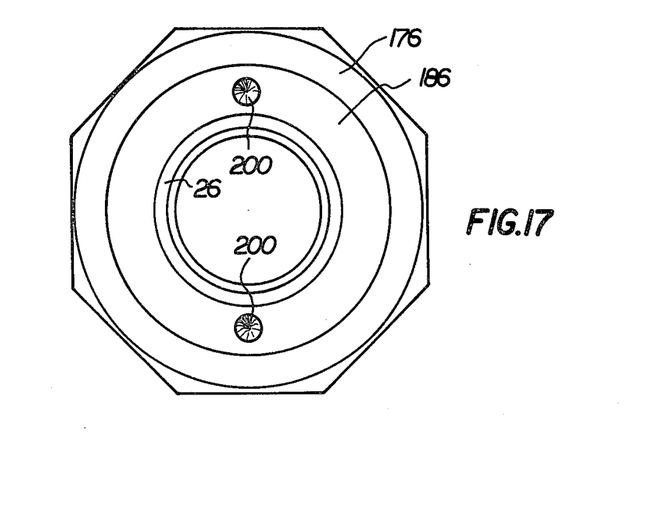
FIG. 17 is an end view of the embodiment of the invention shown in FIGS. 15 and 16.

An especially preferred embodiment of the invention is illustrated in FIGS. 15-17. This embodiment of the invention has sufficient strength characteristics that it can be used with corrugated tubing made of steel and proper tube deformation can be brought about to provide a fluid-tight seal. Although it is anticipated that the composition of the tube will be steel, the numeral 10 still is used to identify the tube insofar as its external dimensions remain unchanged. The connector of this embodiment includes a ferrule 170 comprised of alternating, washer-like half-section rings 172 and unitary spacers 174. Although four rings 172 and three spacers 174 are illustrated, the exact number of rings 172 and spacers 174 used with the invention can be varied. A retainer nut 176 includes an inner diameter 178 larger than the outer diameter of the tube 10 and sufficiently so that the covering 82 can be inserted intermediate the diameter 178 and the tube 10. A cylindrical bushing 180 having a flared end 181 also can be inserted intermediate the covering 82 and the outer diameter of the tube 10. The nut 176 further includes a cylindrical, straight-walled section 182 engageable with the outer diameter of the rings 172 and the spacers 174. A threaded inner surface 184 is a continuation of the straight-walled section 182. A shoulder 185 connects the inner diameter 178 and the straight-walled section 182.

A compression nut 186 also is provided. The compression nut 186 includes a body portion 188 from which an end portion 190 projects. The portion 190 is rounded at its end and preferably is heat treated to provide it with the requisite hardness to deform the steel tube 10. The nut 186 is threaded on its outer surface as indicated at 192 for engagement with the threaded portion 184 of the nut 176. The nut 186 also is threaded on its inner surface as indicated at 194 for engagement with a pipe or conventional fitting. The nut 186 includes a surface 196 positioned at right angles with respect to the end portion 190. A cylindrical stop ring 198 is positioned about the end portion 190 in engagement with the surface 196. The outer diameter of the ring 198 is less than the inner diameter of the threaded portion 184 so that interference between the ring 198 and the threaded portion 184 will not exist. The nut 186 additionally includes a pair of longitudinally extending openings 200 formed near its periphery at diametrically opposed locations. The openings 200 are adapted to receive a spanner wrench for imparting considerable torque to the nut 186.

Assembly of the embodiment of FIGS. 15-17 is carried out as follows:

1. The cover 82 is pushed over the tube 10.
2. The nut 176 is slipped over the cover 82.
3. The bushing 180 is placed over the tube 10 and underneath the cover 82.
4. Alternating half-section rings 172 and spacers 174 are fitted about the endmost corrugations of the tube 10.
5. The cover 82 is positioned such that it flares radially outwardly and is compressed between the shoulder 185 and the flared end 181 of the bushing 180.
6. The ring 198 is seated in position at the end of the nut 186 and the nut 186 is tightened within the nut 176. Contact between the rounded end portion 190 and the flank 26 eventually results. Afterwards, the end of the ring 198 contacts the forwardmost ring 172.

If enough torque is applied to the nut 186, the components eventually will attain that position shown in FIG. 16 where the rings 172 and the spacers 174 are tightly compressed against each other and the endmost corrugations of the tube 10 are compacted. A fluid-tight seal is created by engagement between the flank 26 and the end portion 190, and the covering 82 is firmly clamped in position by the inner diameter 178, the shoulder 185, and the flared end 181.

It will be appreciated from the foregoing description that a connector according to the invention can be used to connect corrugated tubing to pipes, fittings, or other tubing without any modification whatsoever being required of the tubing except for cutting it to proper length. Each embodiment of the invention can be assembled quickly and without special skill or special tools. For those applications where a covering of braided wire or other material is necessary or desirable, the covering can be quickly and securely attached to the connector without need to resort to the prior art practice of welding.

Although the invention has been described in its preferred embodiment with a certain degree of particularity, it will be appreciated that various changes and modifications may be made without departing from the true spirit and scope of the invention. It will be understood that the patent shall cover, by suitable expression in the appended claims, whatever features of patentable novelty exist in the invention disclosed.

What is claimed is:

1. A connector for connecting a corrugated tube to a threaded object such as a pipe or a fitting without requiring modification of the ends of the tube, comprising:
    a ferrule surrounding the tube at the endmost corrugations of the tube, the ferrule engaging the corrugations such that relative axial movement between the ferrule and the tube is not possible;
    a nut disposed about the tube and having portions engageable with the ferrule, the ferrule being disposed intermediate the ferrule-engaging portions of the nut and the object to which the tube is to be secured; and
    a sealing member disposed within the nut and adjacent the end of the tube, whereby the sealing member will be compressed in use between the end of the object and the ferrule to establish a fluid-tight seal.

2. The connector of claim 1, wherein the sealing member is an O-ring.

3. The connector of claim 1, wherein the tube includes annular corrugations and the ferrule includes mating annular corrugations.

4. The connector of claim 1, wherein the ferrule includes a body portion having corrugations engageable with the corrugations of the tube, an end portion positionable adjacent the end of the tube, a cylindrical extension extending away from the end of the tube, and a radially extending shoulder at the interface between the body portion and the extension, the shoulder being engageable with the nut.

5. A connector for connecting a corrugated tube to a threaded object such as a pipe or a fitting without requiring modification of the ends of the tube, comprising:
    a ferrule surrounding the tube at the endmost corrugations of the tube, the ferrule including a body portion having radially inwardly projecting protrusions engaging the corrugations such that relative axial movement between the ferrule and the tube is not possible, the ferrule additionally including an end portion positionable adjacent the end of the tube, a cylindrical extension extending away from the end of the tube, and a radially extending shoulder at the interface between the body portion and the extension;
    a nut disposed about the tube and engageable with the ferrule, the ferrule being disposed intermediate the ferrule-engaging portions of the nut and the object to which the tube is to be secured, the nut including a radially extending shoulder engageable with the shoulder included as part of the ferrule; and
    a sealing member disposed within the nut and positioned adjacent the end portion of the ferrule, the sealing member being compressed in used between the end of the object and the end portion of the ferrule upon the nut being threadedly tightly engaged with the object.

6. The connector of claim 5, wherein the sealing member is an O-ring and the ferrule is in the form of mating half-sections.

* * * * *